J. M. I. GIRIN.
CHANGE SPEED GEAR.
APPLICATION FILED FEB. 9, 1909.

982,666.

Patented Jan. 24, 1911.
2 SHEETS—SHEET 1.

WITNESSES

INVENTOR
Joseph Marie Isidore Girin
BY

ATTORNEYS

J. M. I. GIRIN.
CHANGE SPEED GEAR.
APPLICATION FILED FEB. 9, 1909.
982,666.
Patented Jan. 24, 1911.
2 SHEETS—SHEET 2.
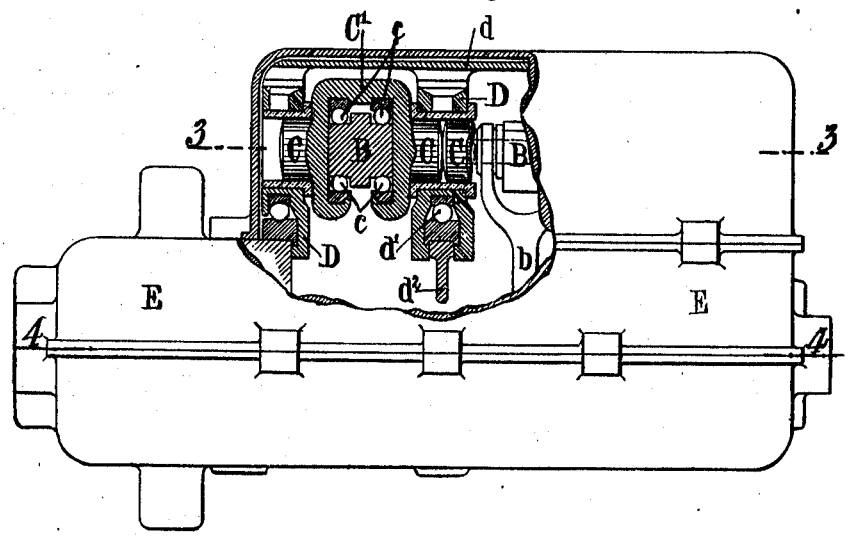
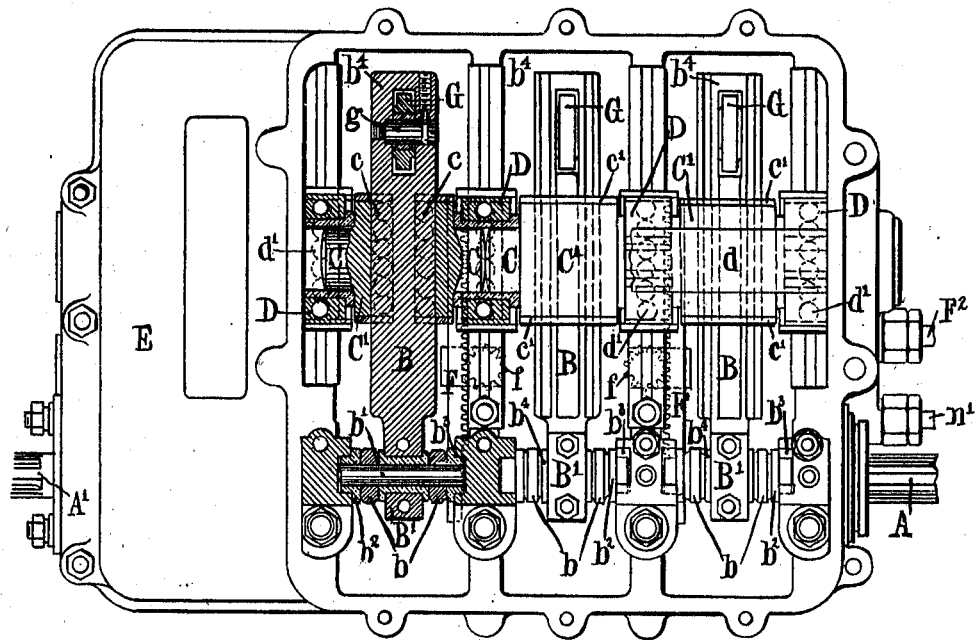

UNITED STATES PATENT OFFICE.

JOSEPH MARIE ISIDORE GIRIN, OF LYON, FRANCE.

CHANGE-SPEED GEAR.

982,666.

Specification of Letters Patent. Patented Jan. 24, 1911.

Application filed February 9, 1909. Serial No. 476,951.

*To all whom it may concern:*

Be it known that I, JOSEPH MARIE ISIDORE GIRIN, of 4 Rue Cuvier, Lyon, Rhone, France, have invented a certain new and useful Improvement in Change-Speed Gear, of which the following is a full, clear, and exact description.

The object of the present invention is to provide a change speed mechanism by which any speed from rest to a predetermined maximum may be progressively obtained.

In carrying out my invention I employ a system of transmitting levers between the driving and the driven shaft, one of said levers being a rock lever, the fulcrum of which is movable along the axis thereof so that the length of the stroke of said lever may be controlled. In connection with said rock lever an oscillating clutch mechanism is employed to rotate the driven shaft. The control and actuation of a shaft by driving ball-clutches being well known and since it has already been proposed to alter the amplitude or stroke of an oscillating lever by varying its fulcrum, the invention consists solely in the combinations hereafter described and in the particular constructional means shown upon the annexed drawings, in which:—

Figure 5:
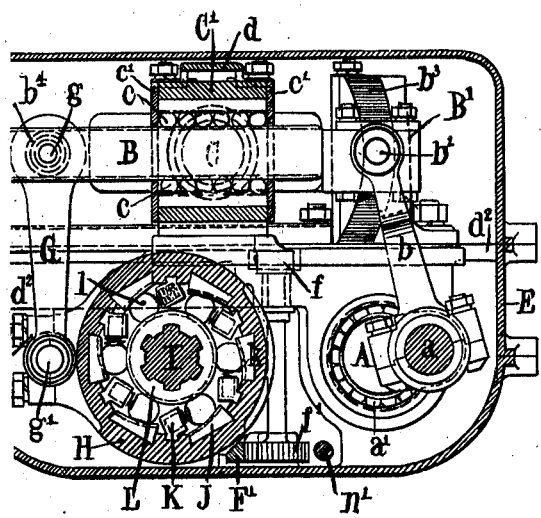
Figure 1:
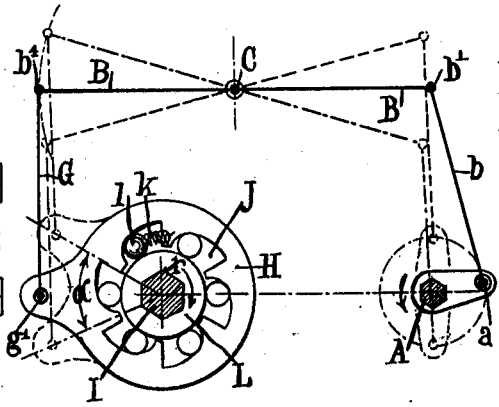
Figure 4:
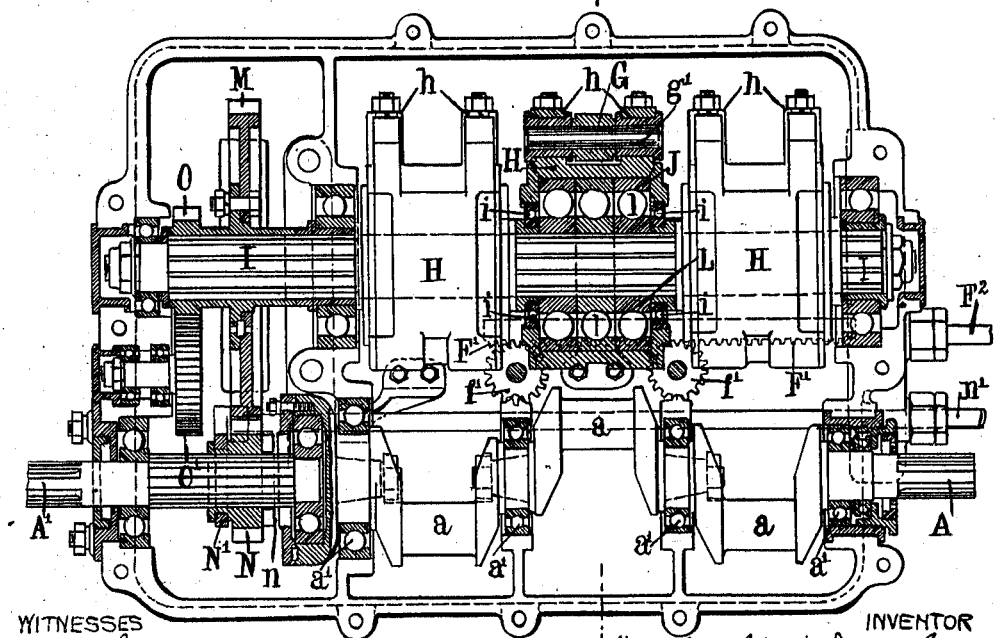

Figure 1 is a diagram of the present mechanism; Fig. 2 is a side elevation, partly broken away, of a practical embodiment of my invention; Fig. 3 is a view in horizontal section on line 3—3, Fig. 2; Fig. 4 is a view in horizontal section on line 4—4 of Fig. 2; Fig. 5 is a view in transverse section on line 5—5 of Fig. 4.

Describing the invention first with reference to the diagram, Fig. 1, A designates a crankshaft coupled to the motor. The connecting rod $b$ secured to said crankshaft by pin $a$ communicates a rocking movement to a lever B on which the pivot C is axially displaceable. The extent of this rocking movement depends, as is well known, on the position of the pivot C which is capable of being moved from C to $b^4$ for example, and this displacement of the pivot C causes the stroke of the end $b^4$ of the lever B to vary from the maximum to zero.

If the extremity $b^4$ be connected to a clutch H movable around a hub L by a connecting rod G, this latter communicates to the clutch H a circular oscillating movement of which the angular stroke $alpha$ obviously varies according to the position of the pivot C, from zero to the maximum admitted. The clutch H is provided with pockets J in each of which is a ball $l$ pressed against the inclined bottom of the pocket by a spring arrangement $k$. These balls of which the number is variable according to the number of pockets, bear also against the hub L which rotates the driven shaft I. During the rising movement of the clutch H, the balls $l$ are wedged between the bottom of the pockets J and the hub L and they drive the latter in the direction of the arrow $x$.

If it be supposed that the crankshaft A has three throws or crank pins $a$, keyed at 120° for example, with which correspond, it is to be understood, three connecting rods $b$, three levers B, three connecting rods G and three clutches H, it will be understood that in spite of the finish of the stroke of the clutch H, the hub L continues its movement, since the crank pins of the crankshaft A being arranged or keyed at 120°, there is at each instant at least one clutch acting upwardly.

During the descending movement of the clutches H, the balls $l$ being driven in the opposite direction by the hub, they are no longer wedged and consequently the clutch H and the hub are no longer fast one with the other, and this hub can thus freely continue its rotation in the same direction. As the three clutches act successively at each turn of the shaft A, three driving efforts are exercised on the shaft I which can thus turn at any desired speed, from zero to a predetermined maximum, according to the displacement and the position of the axis of oscillation of the levers B. Naturally the number of these levers may be increased or diminished according to needs.

In the practical embodiment of my invention illustrated in Figs. 2 to 5, A designates the crankshaft (Figs. 4 and 5) having three crank pins $a$ arranged at angles of 120°; this shaft is mounted on ball bearings $a^1$ and receives the continuous rotary movement of the motor of which the speed to be transmitted is to be modified. Each of the crank pins $a$ is connected to a lever B by the intermediary of a connecting rod $b$. The end of the rod is in the shape of a fork (Fig. 2) to which is rigidly fixed the pin $b^1$. This pin $b^1$ is provided at its two extremities with collars $b^2$ loosely adjusted and arranged to move in a curved slide or guide $b^3$ of which the curve (Fig. 5) corresponds to the path described by the point $b^1$ of Fig. 1, when the fulcrum C is midway between the ends of lever B. This pin $b^1$ is also engaged in a bearing $B^1$ at the end of the lever B. This lever B is supported by a sleeve $C^1$ sliding along the lever from its middle to its extremity $b^4$. Each lever B rests in its sleeve $C^1$ on ball-bearings $c$ which are adjustable, the lever itself having formed thereon the ball race and the balls being retained under the sleeves $C^1$ by end plates $c^1$. On each side, the sleeve $C^1$ is provided with a trunnion C (these two trunnions forming the fulcrum of the lever B, Fig. 2) which rests in movable bearings D. These bearings D are rigidly connected together by the bridge $d$ and they are displaceable upon ball-bearings $d^1$. The ball races of these bearings $d^1$ are supported by a web or part $d^2$ (Fig. 2) in the shape of a T, made integral with the middle portion of the casting E. To each of the central bearings D is fixed a rack F which can be displaced by means of pinions $f$ which are driven by lower pinions $f^1$ fixed upon the same axis; the pinions $f^1$ can be simultaneously moved by the rack $F^1$.

A rod $F^2$ fixed in the prolongation of the rack $F^1$ passes out from the casing at its lower part and allows the whole of the movable bearings D and of the sleeves $C^1$, to be moved from the exterior, perpendicularly to the rack $F^1$. The balls employed in the bearings and sleeves are intended to lessen the considerable friction which would be produced without them and they allow the whole to be manipulated during the working of the apparatus without great expenditure of effort.

The movement of the imaginary axis of the joint or fulcrum C of the three levers B in a horizontal plane has thus been effected, from the middle portion C to the extreme position $b^4$ (Fig. 1). It is to be noted that the different inclinations of the three levers B are without perceptible influence upon this movement.

Rods G pass through the levers B at the extremity $b^4$ and they are connected to these levers by a removable pivot $g$. The lower extremity of these rods G is fitted with a pin $g^1$ fixed in the bearings $h$ which are fast to the driving clutches H. These clutches H are mounted loosely upon the fluted driven shaft I by the intermediary of the ball-bearings $i$ (Fig. 4); undercut grooves within the clutches H allow the wedges J and the spring-carriers K to be fixed in place (Fig. 5). The center of the curve of the wedges J is eccentric to a certain extent relatively to that of the shaft I and, in the opposite direction these wedges J have grooves of predetermined radius. Hubs L peripherally-grooved are fixed upon the fluted shaft I opposite the wedges J. Balls $l$ rest in the groove of the hubs L and are maintained and held against the groove of the wedges J by the springs $k$ seated in the spring-carriers K; these are retained in the driving clutches H by means of under cut grooves.

Since the diameter of the balls $l$ and their number will vary according to the force to be transmitted, one driving clutch H may comprise one, two or more rows of wedges J and of balls $l$, as also a corresponding number of hubs L (three in the example represented in Fig. 4). Each of these rows itself comprises a variable number of balls and of wedges.

The method of working is the following:—When to the connecting rods G is imparted an alternating movement and these rods drive the clutches H in the positive direction (direction of the arrow 1) and since the balls $l$ are unable to slide or roll upon the hub L by reason of the shape of the wedges J and of the action of the springs $k$, they drive these hubs L and the shaft I. When the movement of the rods G changes direction, since the balls $l$ rest upon the ball races formed by the grooves of the wedges J, they become free and roll on these races; they then no longer exert any action on the hub L. On the other hand, by reason of the arrangement at 120° of the crank pins $a$ of the driving shaft A, there is always at least one clutch which acts in the positive direction and the shaft I is thus constantly driven in the direction of the arrow 1.

By suitably choosing the diameter and the number of the balls $l$ as also the curve of the wedges J and by running the whole arrangement of the driving clutches in oil, the wear of the wedges J and of the hubs L is reduced to the minimum; when necessary, the wedges J and the hubs L being interchangeable can easily be replaced.

Since the angular stroke of the driving clutches H varies with that of the extremity $b^4$ of the levers B, it is evident that the driving speed of the shaft I depends upon the extent of the stroke of $b^4$. Consequently, by causing the point C to coincide with the point $b^4$, thus immobilizing the latter, the speed of the shaft I is *nil*. This speed increases progressively up to the maximum speed provided, if the point C be displaced toward the right (Fig. 1).

From Fig. 4 it will be seen that the present mechanism comprises also a gear wheel M destined to communicate to the driven shaft $A^1$ the modified speed of the driving shaft A. A sliding train of wheels N actuated by a fork $N^1$ of which the rod $n^1$ projects outside the casing, imparts the forward drive, and by means of the pinions O $O^1$ the rearward drive, and also a direct drive when braking the engine, by reason of the connection with the driving shaft A through a claw clutch n.

It is to be understood that without departing from the scope of this invention, it is possible to modify it by alterations which do not change the principle thereof.

I claim as my invention—

1. In a change speed gear, a driving and a driven shaft, a crank shaft on the driving shaft, a rock lever one end of which is connected to said crank shaft, clutch mechanism engaging said driven shaft and connected to the other end of said rock lever, in combination with a fulcrum displaceable along the axis of said rock lever, together with a rack connected to said fulcrum and guided against angular displacement, a pinion engaging said rack and means for actuating said pinion whereby the position of said fulcrum may be shifted along the length of said rock lever.

2. In a change speed gear, driving and driven shafts, a rock lever, means for operatively connecting the opposite ends of the latter to said shafts respectively in combination with displaceable pivot means for said lever, comprising a sleeve embracing said lever, ball races extending lengthwise of said lever and balls therein whereby said sleeve is displaceable lengthwise of said lever, in combination with trunnions on said sleeve, ball bearings for said trunnions and means for displacing said trunnion bearings lengthwise of the rock lever, as and for the purpose described.

3. In a change speed gear, a driving and a driven shaft arranged in parallel, a crank shaft of constant length on said driving shaft, a rock lever connected thereto at one end, a guideway of predetermined curvature for said end to control its longitudinal displacement, a clutch mechanism engaging the driven shaft connected to the other end of said rock lever, in combination with a fulcrum for said rock lever displaceable along the length of the latter, said fulcrum comprising a sleeve embracing said lever, and mounted thereon through ball bearings, trunnions on said sleeve, ball bearings for said trunnions and means for displacing said trunnion bearings lengthwise of the rock lever, as and for the purpose described.

In testimony whereof I have signed my name to this specification, in the presence of two subscribing witnesses.

JOSEPH MARIE ISIDORE GIRIN.

Witnesses:
THOS. N. BROWNE,
MARTIN VACHORY.